United States Patent Office 3,231,410
Patented Jan. 25, 1966

3,231,410
GRAFT COPOLYMER COMPOSITION, METHOD OF COATING THEREWITH AND RESULTANT ARTICLE
Gordon Huber, Cuyahoga Falls, Milan A. Rolik, Akron, and Gerard E. van Giles, Cuyahoga Falls, Ohio, assignors to The General Tire & Rubber Company, Akron, Ohio, a corporation of Ohio
No Drawing. Filed July 25, 1960, Ser. No. 91,561
19 Claims. (Cl. 117—75)

The present invention relates to compositions which are particularly useful as metal primers, to copolymers useful in making these compositions and to methods for making said copolymers.

One of the difficulties involved in using an aqueous primer composition is that after drying and baking and subsequently applying enamels or lacquers, the primer coat does not exhibit the required adhesion between the metal surface and the enamel or lacquer finish, or may swell or blister to such an extent as to impair the top or finish coat. It would be highly desirable to have a satisfactory aqueous metal primer composition which would avoid these difficulties. Moreover, the use of aqueous primer compositions rather than organic primer solutions avoid fire hazards and air pollution from the incorporation of the organic solvents. This problem is particularly serious in the automobile industry where large parts must be rapidly and economically primed and which heretofore involved the use of considerable amounts of inflammable or dangerous organic solvents which were vented to the air contributing to the smog problem or requiring expensive recovery equipment.

Accordingly, it is a primary object of the present invention to provide an aqueous composition of matter characterized in being particularly useful for prime coating metal surfaces.

It is another object to provide a copolymer which when applied in aqueous media to a metal surface, and subsequently coated with conventional enamels and lacquers, will exhibit good enamel and lacquer holdout or adhesion.

It is still another object of this invention to provide a method for making a copolymer which has a relatively long shelf life, which can be applied in aqueous media and when compounded with pigments and extenders will provide a highly useful metal priming composition.

Yet another object is to provide an article of manufacture such as a metal sheet and the like containing a coating of a particular copolymer which can be readily overcoated with an enamel or lacquer to provide improved results.

These and other objects and advantages of the present invention will become more apparent to those skilled in the art from the following detailed description and examples.

According to the present invention, it has been found that compositions useful as metal primers can be obtained from an aqueous mixture or latex comprising from about 40 to 80 parts by weight of finely divided inorganic pigments and extenders and a graft copolymer in the form of a latex in the amount of from about 60 to 20 parts by weight (solids). This particular copolymer is obtained by emulsion copolymerizing an open chain conjugated diene monomer with a vinyl aryl compound in aqueous media to a conversion of from about 50 to 90% and then adding to the mixture of copolymer and monomers a third monomeric material such as an alkyl alkacrylate, a mixture of an alkyl alkacrylate and up to 50% of said mixture of an alkyl acrylate, or a vinyl aryl monomer such as used initially in the copolymerization. The polymerization of the mixture is then continued to from about 90 to 100% conversion without the addition of short-stops or stripping. The polymerization should be conducted under alkaline conditions in the presence, or with the addition thereto, of an aliphatic amino alcohol. The resulting latex primer when compounded with pigments and extenders and dried exhibits a mirror finish, excellent water resistance and a controlled solvent resistance to both lacquer and enamel solvents. Because of this controlled solvent resistance, both enamels and lacquers are able to bite into the primer substantially to give good intercoat adhesion and yet the primer surface is not swelled nor blistered to such an extent as to dull or distort the luster of the finished top coats nor to pull away from the underlying metal layer. These properties are especially critical for enamel type finishes and hence are described as good enamel holdout. Other advantages exhibited by the copolymer of the present invention are its good hardness and its extremely good impact resistance due to its inherent flexibility.

Coatings obtained from the latex of this invention are capable of repeated baking cycles without the continued increase in hardness and subsequent loss of flexibility and impact resistance which coatings from other latices exhibit. Moreover, the primer coatings of this invention are resistant to hydrocarbon and ketone ester solvents after a 20 minute bake at 350° F. This allows the primer to serve in a two-fold capacity (1) as a surfacer, i.e., it smooths out metal imperfections and holds out solvents imparting a high gloss to oil base topcoats and (2) as a barrier against corrosion.

Tests of up to three months showed that films obtained from the aqueous primer composition of this invention to be impervious to strong caustic and acidic solutions. Also, apparently, the latex and pigment and extender particles, when combined therewith, exhibit good packing to give better film integrity with a resilient, tough and mark-proof primer coating without having to sand the coating. Normally, primers must be sanded before lacquer coatings are applied. Although primer films obtained from the present composition are as hard as, and in some cases harder than conventional oleoresinous primers and surfacers, the present material retains its flexibility, absorbing distortions of up to 28% elongation and impacts as high as 80 inch/lbs. High temperatures, such as 400° F., for extended or repeated periods and freezing conditions down to —18° C. fail to cause embrittlement and inhibit this flexibility. Furthermore, the latex of this invention has very good low foaming qualities compared to many other latices, and it, also, negates the period of flash time usually necessary prior to baking which accordingly reduces production time and handling procedures.

A principal characteristic of the films or coatings obtained from the present aqueous emulsion is an unusual adhesion to a variety of substrates, such as metal, glass and plastics with outstanding intercoat adhesion to enamels and the new acrylic lacquers. The latex, as a film by itself, exhibits improved water and salt-fog resistance and improved enamel and lacquer holdout. The fine particle size of the latex from 0 up to about 500 Angstroms permits the utilization of micronized pigments and extenders with their enormous surface areas. This high-binding capacity of the copolymer conversely necessitates less binder and results in a high solids film with optimum physical properties at lower film thicknesses than had heretofore been possible.

While it is not precisely known what causes these results, it is believed that the parent substantially linear copolymer is sheathed or grafted with polymers of the third monomer. For example, when butadiene, styrene and methyl methacrylate are used, it is believed that the rubber-like parent backbone copolymer of butadiene and styrene contributes to the excellent flexibility and water resistance observed and that the graft polymer or copolymer side chains of methyl methacrylate provide excellent adhesion to metal and contribute to the superior holdout to enamels and lacquers which have been found. For example, it is belived that the copolymers obtained with butadiene, styrene and methyl methacrylate according to the present invention involve a copolymer of butadiene and styrene, a graft on the copolymer of a terpolymer of butadiene, styrene and methyl methacrylate, a terpolymer of butadiene, styrene and methyl methacrylate, a graft homopolymer of methyl methacrylate on the butadiene and styrene copolymer and a homopolymer of methyl methacrylate, although it is apparent that other combinations may exist. Some of the monomers of the copolymer may well be in the form of blocks or may be randomly or alternately distributed.

On the other hand, when primers are made by the emulsion copolymerization of butadiene and styrene alone to 100% conversion and then monomeric methyl methacrylate is copolymerized onto the butadiene-styrene backbone, the resulting material is not stable in that atfer a few weeks, it would not form a statisfactory primer and tended to gel. Moreover, films from this graft polymer were sensitive to moisture. On the other hand, while blends of latices of a coplymer of butadiene and styrene with a homopolymer of methyl methacrylate, exihibit fair enamel holdout in that only fine wrinkling and crazing occurred in the enamel layer after evaporation of the aromatic solvent from the top coat, they did not exhibit satisfactory lacquer adhesion holdout in that the lacquer coating after drying exhibited blisters and could be readily separated from the primer layer.

The diene used in the production of the copolymer can be any organic aliphatic conjugated diene having from 4 to 8 carbon atoms such as butadiene-1,3; 2-methyl butadiene-1,3; 2-propyl butadiene-1,3; 2,3-dimethyl butadiene-1,3; 2,3-diethyl butadiene-1,3 and their substituted derivatives, such as 2-chloro butadiene-1,3; cyanoprene etc. It is preferred to employ conjugated dienes consisting of carbon and hydrogen.

The vinyl aryl compound can be any monovinyl substituted benzene compound, such as styrene; 4-methyl styrene; 3-methyl styrene alpha methyl styrene, alpha chloro styrene, beta chloro styrene, 4-methyl, alpha-chloro styrene, or any similar compound having one benzene ring containing one vinyl group and which may be substituted with a halogen atom (F, Cl, Br or I) and/or an alkyl group of from 1 to 5 carbon atoms.

The third or graft monomer, which is introduced after copolymerization has proceeded to a substantial extent, is any one of the following monomers or mixtures thereof:

(A) An alkyl alkacrylate or mixtures of alkyl alkacrylates having the formula

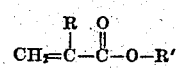

where R and R' are alkyl groups of from 1 to 3 carbon atoms. Examples of useful alkyl alkacrylates are methyl methacrylate, methyl ethacrylate, methyl propacrylate, ethyl methacrylate, ethyl ethacrylate, ethyl propacrylate, propyl methacrylate, isopropyl methacrylate, propyl ethacrylate, propyl propacrylate and the like.

(B) A monomeric mixture of (A) above and up to 50% by weight of the monomeric mixture of an alkyl acrylate having the formula

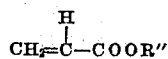

where R'' is an alkyl group of from 1 to 8 carbon atoms. Examples of useful alkyl acrylates are methyl acrylate, ethyl acrylate, propyl acrylate, isopropyl acrylate, butyl acrylate, isobutyl acrylate, amyl acrylate, isoamyl acrylate, hexyl acrylate, 3-ethyl-butylene acrylate, heptyl acrylate, octyl acrylate, 2-ethyl hexyl acrylate, etc. These mixtures of alkyl alkacrylates and alkyl acrylates are very useful in can coating compositions, although they provide graft copolymers which are somewhat softer than those in (A) above. However, these coatings, after baking, are good and can be used in stampings. It is preferred that for can coating compositions, the ratio of the alkyl alkacrylate to the alkyl acrylate be from about 7 to 3 mols.

(C) Aryl vinyl monomers such as one of the styrenes mentioned above, i.e., styrene, alpha-methyl styrene, alpha chloro-styrene, etc. Thus any of the vinyl aryl compounds as defined above can be grafted on to the copolymer. While these monomers make harder coating than those using (A) above, their enamel holdout is not as good in that slight crazing and wrinkling are sometimes observed.

In the final graft copolymer, or mixture thereof, the diene should constitute from about 50 to 60 percent by weight, preferably from 50 to 55 percent by weight, and the vinyl aryl monomer should constitute from 7 to 12 percent by weight, preferably from 8.5 to 9.5 percent by weight, and the balance of the monomeric material should be essentially one or more of the monomers described in paragraphs A, B and C above. If much more than these ranges of the vinyl aryl type monomer content is used, the adhesion of the resulting graft copolymers is appreciably reduced. The larger amounts of the third monomeric material such as methyl methacrylate improve the enamel holdout of the composition.

The monomers are polymerized in aqueous emulsion at a pH of about 7, that is, under alkaline conditions using an anionic emulsifier. Preferably to obtain improved water resistance in the graft copolymer, polymerization should be conducted in the presence of the salt, reaction product or mixture of a stable aliphatic amino alcohol and an aliphatic monocarboxylic acid. The alcohol is preferably volatile at about film or paint baking temperatures of from about 50 to 350° F. Examples of useful amino alcohols are those having one primary or secondary amino nitrogen atom, one hydroxyl group and from 2 to 5 carbon atoms, such as alpha amino ethanol, beta amino ethanol, 1-amino propanol-3, 2-amino propanol-3, 1-amino butanol-4, 2-amino-2-methyl-1-propanol, 2-amino pentanol-4, 1-amino pentanol-5, 1-amino isobutanol-3, 2-ethyl amino ethanol, 3-methyl amino propanol, 2-propyl amino ethanol and the like. The acid is an aliphatic monocarboxylic acid having from 8 to 22 carbon atoms. Examples of useful acids are pelargonic, stearic, caprylic, capric, myristic, palmistic, arachidic, behenic, delta 9-decylenic, delta 9-dodecylenic, oleic, ricinoleic, linolenic, erucic, gadolenic, 3-methyl heptanoic, alpha-octyl capric acid and the like. The acid and amino alcohols may be reacted in mol ratios of 40:60 to 60:40 although approximately equal molar ratios are preferred. The acid and amino alcohol may be reacted together first and then added to the polymerization reactor. However, it is preferred to add them separately to the reactor to form the salt in situ to avoid the formulation of a gel which sometimes occurs and which may delay polymerization until it disperses. The acid and amino alcohol or their salt are used in an amount of about 1 to 10 parts by weight per 100 total parts by weight of the monomers employed. Mixtures of the acids and amino alcohols can be used.

The monomers are copolymerized in aqueous media, preferably deionized water, using emulsifiers, catalysts and other polymerization aids. The polymerization is usually conducted at a temperature of from about 25 to 150° C. with agitation although temperatures of from about 40 to 60° C. are preferred.

The diene and vinyl aryl compound are first added to the polymerization vessel and copolymerized to a conversion of from about 50 to 90%, preferably from 50 to 70%, and then the third monomer is added and polymerization is allowed to go from 90 to 100%. It is preferred not to add short-stops to avoid films which are difficult to harden or cure. No stripping of residual diene or vinyl aryl compound should be made prior to the addition of the third monomeric material. The resulting latex should have a solids content of from about 35 to 45%, preferably from about 40 to 43%, by weight.

The resulting latex can then be used as a coating on various base materials such as wood, glass, metal, plastics, etc. and then baked at a temperature of up to about 350° F. to provide an adherent coating or film. The primer, also, may be used as an adhesive between two layers of metal, between a metal base and plastic coating or a paint film such as one of the lacquers or enamels previously mentioned. However, it is much preferred in order to obtain the requisite hardness of the primer when used as a primer coating on a metal base, particularly for metal bodies of automobiles, etc., to mix the latex of this invention with about 40 to 80 parts by weight, preferably from 50 to 70 parts by weight (per 60-20 or 50-30 parts by weight of the copolymer as solids) of one or more finely divided inorganic pigments and extenders. Examples of pigments are titanium dioxide, red iron oxide, carbon black, etc. Examples of extenders which are preferably of low density are aluminum silicate, silica, calcium silicate, china clay, talc, mica and other metal silicates. High density pigments, such as barium sulfate and medium grind calcium carbonate also can be used. The pigment particles should be of a size to give the desired packing. Still other materials can be added to the primer composition such as organic pigments, phthalocyanine blue and green, water, volatile amines (especially if the pigment is on the acid side), water soluble or dispersible resins, plasticizers, rubbers, anti-foaming agents, surfactants, fungicides, bactericides, corrosion resistant agents and the like. When resinous materials are employed with the latex primer, they can be used in amounts of up to about 25% by weight of the resin (dry solids), 75% and up being the graft copolymer. These resinous or rubber materials can be compounds such as phenol-formaldehyde resins, melamine-acrylic polymers etc. For can coatings, however, clear films are desired and accordingly pigmentation should be avoided or reduced. The graft copolymer of this invention, as previously mentioned, can withstand high pigment concentration. It has a pigment volume concentration (P.V.C.) of up to about 45 whereas other latices cannot be formulated much above 30 P.V.C. A particularly good can coating composition is obtained from a latex of a copolymer of butadiene and styrene, on which has been grafted methyl methacrylate and ethylacrylate according to the method of the present invention. This particular material provides very good protection to the base metal, greater hardness and blush resistance and good flexibility. While the ranges shown above of the pigment extender to the latex represent practical or preferred ranges, it will be appreciated that more latex or graft copolymer can be added. However, this increases the cost of the primer composition without greatly improving results. At the other end of the range, more pigment can be added to the primer composition, but this tends to result in a loss of adhesion of the primer to the metal base and loss of flexibility.

The following examples will serve to illustrate the invention with more particularity to those skilled in the art.

EXAMPLE I

A latex was made by copolymerizing butadiene-1,3 and styrene to about 70% conversion when methyl methacrylate was introduced into the reactor and the polymerization continued at 100% conversion. The polymerization recipe and conditions are shown below:

| | Parts by weight |
|---|---|
| Butadiene-1,3 (10–15 p.p.m. TBC, tertiary butyl catechol) | 54.5 |
| Styrene (0.01% TBC) | 9.1 |
| Methyl methacrylate (0.006% HQ hydroquinone) | 36.4 |
| $H_2O$ (deionized) | 140 |
| 2-amino-2-methyl-1-propanol (Tech) | 1.5 |
| Oleic acid (Tech) | 4.0 |
| $K_2S_2O_8$ | 0.3 |
| n-DIM (normal dodecyl mercaptan) | 0.5 |
| Nullapon NaFe-12 (iron-sodium salt of ethylene diamine tetra-acetic acid) | 0.05 |

Reaction time, 20 to 22 hours.
No shortstop.
No stripping.
Post stabilizer, 2 parts AMP-oleate.
Methyl methacrylate added at 27–28% TSC.
Temperature, 50° C.

Final properties:

| | |
|---|---|
| TSC | 40 ±1%. |
| pH | 8–9. |
| Brookfield viscosity | 45 ±5 c.p.s. |
| Surface tension | 41 dyne/cm. |
| Percent gel (benzene) | 60%. |
| Swell index | 25%. |
| Inherent visc. (benzene) | 1.00. |
| Particle size | 0–200 Angstroms. |
| Heat stability: | |
|   10 days | 160° F. |
|   8 hours | 203° F. |

It is believed that the resulting polymeric material comprised a copolymer of 85.6% butadiene-1,3 and 14.4% styrene, on which was grafted a terpolymer of 29.5% butadiene-1,3, 4.9% styrene and 65.6% methyl methacrylate. Some homopolymer may well have been present. The resulting latex was stable by accelerated aging tests and after shelf aging for several months.

The resulting latex was sprayed onto Parkerized (phosphated) steel panels and baked at a temperature of 350° F. until it was dry. The coated panels were then painted with lacquers and enamles and baked. The enamels and lacquers used were conventional automobile finishes such as Ditzler Division Pittsburgh Plate Glass Co. enamels black DRE–9201 and white M–30J–948(DRE–8150) and du Pont acrylic lacquer 2702–L. The coatings exhibited excellent enamel and lacquer holdout and adhesion and improved salt-fog resistance. The panels could also be bent into an angle of about 45° without cracking the film and could withstand an impact of 80 inch/lbs. After salt-fog exposure of 250 hours, there was no blistering and no texturing. Corrosion was conspicuously missing, and there was, also, no sign of texturing after a water immersion test. The adhesion of the primer to the enamel or lacquer and metal base was very satisfactory. In this test a stripper, or ice pick and the like, is used to cut through the film. A piece of pressure-sensitive adhesive tape is then applied to one of the cut portions in an attempt to pull off the lacquer or enamel layer. Using the present primer, the outer paint surface does not separate from the primer coating. On the other hand, when a primer of only a copolymer of butadiene-styrene rubber latex was used, the enamel and lacquer top coatings readily separated from the primer coating. Likewise when blends of butadiene-styrene copolymer rubber latex and methyl methacrylate homopolymer latex were used as a primer coating, the lacquer and enamel layers could readily be pulled away from the primer coating. Furthermore, a terpolymer was made by adding butadiene, styrene and methyl methacrylate to the reactor together and polymerizing them together. It provided a material which, when made into a film and dried and subsequently coated with a lacquer, was unsatisfactory in that it did not have good holdout properties since it blistered and the layers could be separated.

EXAMPLE II

The method of this example was essentially similar to that of the preceding example, except that only copolymers and homopolymers were prepared. The latices were then blended and used to coat (phosphated) steel panels which were baked and subsequently painted with lacquers and enamels and baked again. The resulting panels were then tested similarly to the tests of Example I, above. The amounts of polymer used in the mixed latices and ratio of monomers in the latices with the results obtained are shown below:

Table 1.—Monomer ratios derived for mixtures of homo- and copolymers

| Run No. | Polymer Parts | | | | | | Composite Monomer Ratios | | |
|---|---|---|---|---|---|---|---|---|---|
| | A | B | C | D | E | F | BD | Styrene | MMA |
| 1 | | | 4 | 1 | | | 3 | 1 | 1 |
| 2 | | | 4 | 1 | 1 | | 3 | 2 | 1 |
| 3 | | | 4 | 2 | 1 | | 3 | 2 | 2 |
| 4 | | | 2 | 1 | 1 | | 3 | 3 | 2 |
| 5 | | | 8 | 2 | 1 | | 3 | 1.5 | 1 |
| 6 | | | 8 | 3 | 1 | | 3 | 1.5 | 1.5 |
| 7 | | | 8 | 4 | 1 | | 3 | 1.5 | 2 |
| 8 | | | 8 | 5 | 1 | | 3 | 1.5 | 2.5 |
| 9 | | 1 | 1 | | | | 3 | 0.65 | 1.57 |
| 10 | | 1 | 2 | | | | 3 | 3 | 3 |
| 11 | | 2 | 3 | | | | 3 | 1.2 | 1.56 |
| 12 | | 3 | 2 | | | | 3 | .79 | 0.95 |
| 13 | | 2 | 1 | | | | 3 | .75 | 1.2 |
| 14 | | 2 | | | | 1 | 3 | 1.5 | 3 |
| 15 | 1 | 1 | | 1 | | | 3 | 1.17 | 0.68 |

A is a copolymer of 60 parts (butadiene-1,3) parts by weight BD and 40 parts by weight MMA (methyl methacrylate).
B is a copolymer of 40 parts BD and 60 parts MMA.
C is a copolymer of 75 parts BD and 25 parts MMA.
D is a homopolymer of MMA.
E is a homopolymer of styrene.
F is a copolymer of 62 parts styrene and 38 parts BD.

Results obtained: Unpigmented mixtures of these copolymers and homopolymers are very unstable in that they gelled in 3–4 days and baked films obtained from the same were entirely too soft. Mixtures of these copolymers and homopolymers were stable in pigments and made a hard primer but were not good with acrylic lacquers. They showed poor wetting and texturing and pinholes.

EXAMPLE III

The latex of Example I, above, was mixed with various pigments to make it harder and improve its water resistance and the like, as well as to reduce its cost. The pigments employed and the amounts of the same are shown below:

| Pigment disperison: | Pounds |
|---|---|
| Titanium dioxide | 18.9 |
| Aluminum silicate | 236.0 |
| Barytes (Sparmite) | 239.4 |
| Carbon black (Aquablak K 30%) | 2.0 |
| Phthalocyanine blue (20%) | 0.8 |
| Water | 225.8 |
| 2-amino-2-methyl-1-propanol | 5.1 |
| Melaqua 600 (50% T.S.C.) (a water soluble melamine-acrylic resin) | 95.8 |
| Morpholine | 2.0 |
| Nalco 71D5 | 0.9 |
| Foamex | 0.6 |
| Latex of Example I, above (40% T.S.C.) | 359.6 |
| Total | 1186.9 |

Nalco 71D5 is a liquid mixture of a polyglycol and a fatty acid type of surface active material—Nalco Chemical Co.. Foamex is an odorless, pale yellow liquid foam retarder having a specific gravity of 0.96–0.97, insoluble in water but soluble in hydrocarbons and oils—Glyco Products Co.

The resulting compounding primer mixture was then cast onto Parkerized (phosphated) steel plates and baked at 300 to 350° F. The resulting primed panels were then coated with the enamles and lacquers of the foregoing examples and tested. The results of the tests showed that these panels had improved water resistance, corrosion resistance and hardness and exhibited high holdout to the solvent of the enamels and lacquers.

It is to be understood that in accordance with the provisions of the patent statutes the particular form of compositions and products shown and described and the particular methods and procedures set forth are presented for purposes of explanation and illustration and that various modifications of said compositions, products, methods and procedures can be made without departing from this invention.

What is claimed is:

1. The method which comprises aqueous emulsion copolymerizing to a solids content of from about 35 to 45% by weight of said emulsion, at least one open chain conjugated diene having from 4 to 8 carbon atoms with at least one mono-vinyl aryl compound in the presence of a salt of an aliphatic monocarboxylic acid having from 8 to 22 carbon atoms and a volatile aliphatic amino alcohol having from 2 to 5 carbon atoms and being selected from the group consisting of primary amino alcohols and secondary amino alcohols, said alcohol having one amino nitrogen atom and one hydroxyl group and the mol ratio of said acid to said alcohol being 40:60 to 60:40, to a conversion of said diene and mono-vinyl aryl compound to copolymer of from about 50 to 90%, adding to the resulting monomer and copolymer mixture a monomeric material and continuing the polymerization to a coversion of from about 90 to 100%, said monomeric material being at least one monomeric material selected from the group consisting of (a) an alkyl alkacrylate having the formula:

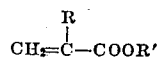

where R and R' are alkyl radicals of from 1 to 3 carbon atoms, (b) a monomeric mixture of (a) and up to about 50% by weight of the monomeric mixture of an alkyl acrylate having the formula $CH_2=CH—COOR''$ where R'' is an alkyl radical of from 1 to 8 carbon atoms, and (c) a mono-vinyl aryl monomer, said diene being employed in an amount of from about 50 to 60% by weight, said mono-vinyl aryl compound being employed in an amount of from about 7 to 12% by weight and the balance being essentially said monomeric material, the total of said diene, said mono-vinyl aryl compound and said monomeric material being equal to 100% by weight.

2. The method according to claim 1 where said first-named conversion to copolymer is conducted to from about 50 to 70%, said total solids content is from about 40 to 43% by weight of said emulsion, said diene is employed in an amount of from about 50 to 55% by weight, and said mono-vinyl aryl compound is employed in an amount of from about 8.5 to 9.5% by weight.

3. The method according to claim 2 in which said monomeric material is (a).

4. The method according to claim 3 in which said diene is butadiene-1,3, said mono-vinyl aryl compound is styrene, said alkyl alkacrylate is methyl methacrylate, said alcohol is 2-amino-2-methyl-1-propanol and said acid is oleic acid.

5. A graft copolymer prepared according to the method of claim 1.

6. A graft copolymer according to claim 5, where said first-named conversion to coploymer is conducted to from about 50 to 70%, said total solids content is from about 40 to 43% by weight of said emulsion, said diene is employed in an amount of from about 50 to 55% by weight, and said mono-vinyl aryl compound is employed in an amount of from about 8.5 to 9.5% by weight.

7. A graft copolymer according to claim 6 in which said monomeric material is (a).

8. A graft copolymer according to claim 7 in which said diene is butadiene-1,3, said mono-vinyl aryl compound is styrene, said alkyl alkacrylate is methyl methacrylate, said alcohol is 2-amino-2-methyl-1-propanol and said acid is oleic acid.

9. A composition of matter comprising a mixture of from about 40 to 80 parts by weight of finely divided inorganic pigments and extenders and from 60 to 20 parts by weight of a graft copolymer in latex form, said graft copolymer having been prepared by the method which comprises aqueous emulsion copolymerizing to a solids content of from about 35 to 45% by weight of said emulsion at least one open chain conjugated diene having from 4 to 8 carbon atoms with at least one mono-vinyl aryl compound in the presence of a salt of an aliphatic monocarboxylic acid having from 8 to 22 carbon atoms and a volatile aliphatic amino alcohol having from 2 to 5 carbon atoms and being selected from the group consisting of primary amino alcohols and secondary amino alcohols, said alcohol having one amino nitrogen atom and one hydroxyl group and the mol ratio of said acid to said alcohol being 40:60 to 60:40, to a conversion of said diene and mono-vinyl aryl compound to copolymer from about 50 to 90%, adding to the resulting monomer and copolymer mixture a monomeric material and continuing polymerization to a conversion of from about 90 to 100%, said monomeric material being at least one monomeric material selected from the group consisting of (a) an alkyl alkacrylate having the formula:

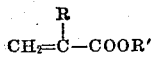

where R and R' are alkyl radicals of from 1 to 3 carbon atoms, (b) a monomeric mixture of (a) and up to about 50% by weight of the monomeric mixture of an alkyl alkacrylate having the formula $CH_2=CH-COOR''$ where R'' is an alkyl radical of from 1 to 8 carbon atoms, and (c) a mono-vinyl arylmonomer, said diene being employed in an amount of from about 50 to 60% by weight, said mono-vinyl aryl compound being employed in an amount of from about 7 to 12% by weight and the balance being essentially said monomeric material, the total of said diene, said mono-vinyl aryl compound and said monomeric material being equal to 100% by weight.

10. A composition according to claim 9 in which said mixture of inorganic pigments and extenders is used in an amount of from about 50 to 70 parts by weight, said graft copolymer is used in an amount of from 50 to 30 parts by weight, where said first-named conversion to copolymer is conducted to from about 50 to 70%, said total solids content is from about 40 to 43% by weight of said emulsion, said diene is employed in an amount of from about 50 to 55% by weight, and said mono-vinyl aryl compound is employed in an amount of from about 8.5 to 9.5% by weight.

11. A composition of matter according to claim 10 in which said monomeric material is (a).

12. A composition of matter according to claim 11, in which said diene is butadiene-1,3, said mono-vinyl aryl compound is styrene, said alkyl alkacrylate is methyl methacrylate, said alcohol is 2-amino-2-methyl-1-propanol and said acid is oleic acid.

13. A composition comprising a graft copolymer of from about 50 to 60% by weight of an open chain conjugated diene having from 4 to 8 carbon atoms, a mono-vinyl aryl compound in an amount of from 7 to 12% by weight and the balance being essentially at least one monomeric material selected from the group consisting of (a) an alkyl alkacrylate having the formula:

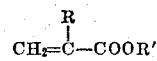

where R and R' are alkyl radicals of from 1 to 3 carbon atoms, (b) a monomeric mixture of (a) and up to 50% by weight of the monomeric mixture of an alkyl acrylate having the formula $CH_2=CH-COOR''$ where R'' is an alkyl radical of from 1 to 8 carbon atoms and (c) a mono-vinyl aryl monomer, the total of said diene, said mono-vinyl aryl compound and said monomeric material being equal to 100% by weight, and a salt of an aliphatic monocarboxylic acid having from 8 to 22 carbon atoms and a volatile aliphatic amino alcohol having one amino nitrogen atom and one hydroxyl group, having from 2 to 5 carbon atoms and being selected from the group consisting of primary amino alcohols and secondary amino alcohols, the mol ratio of said acid to said alcohol being 40:60 to 60:40, said diene and said mono-vinyl aryl compound having been polymerized to a conversion of from about 50 to 90% prior to further polymerization in the presence of said monomeric material.

14. An article of manufacture comprising a basic material and a hard baked coating on said material of a graft copolymer obtained by aqueous emulsion copolymerizing to a solids content of from about 35 to 45% by weight of said emulsion, at least one open chain conjugated diene having from 4 to 8 carbon atoms with at least one mono-vinyl aryl compound in the presence of a salt of an aliphatic monocarboxylic acid having from 8 to 22 carbon atoms and a volatile aliphatic amino alcohol having from 2 to 5 carbon atoms and being selected from the group consisting of primary amino alcohols and secondary amino alcohols, said alcohol having one amino nitrogen atom and one hydroxyl group and the mol ratio of said acid to said alcohol being 40:60 to 60:40, to a conversion of said diene and mono-vinyl aryl compound to copolymer of from about 50 to 90%, adding to the resulting monomer and copolymer mixture a monomeric material and continuing the polymerization to a conversion of from about 90 to 100%, said monomeric material being at least one monomeric material selected from the group consisting of (a) an alkyl alkacrylate having the formula:

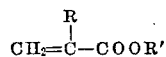

where R and R' are alkyl radicals of from 1 to 3 carbon atoms, (b) a monomeric mixture of (a) and up to about 50% by weight of the monomeric mixture of an alkyl acrylate having the formula $CH_2=CH-COOR''$ where R'' is an alkyl radical of from 1 to 8 carbon atoms, and (c) a mono-vinyl aryl monomer, said diene being employed in an amount of from about 50 to 60% by weight, said mono-vinyl aryl compound being employed in an amount of from about 7 to 12% by weight and the balance being essentially said monomeric material, the total of said diene, said mono-vinyl aryl compound and said monomeric material being equal to 100% by weight.

15. An article of manufacture according to claim 14 in which said graft copolymer coating contains additionally from about 40 to 80 parts by weight of a mixture of finely divided inorganic extenders and pigments, per 60 to 20 parts by weight of said graft copolymer, where said first-named conversion to copolymer is conducted to from about 50 to 70%, said total solids content is from about 40 to 43% by weight of said emulsion, said diene is employed in an amount of from about 50 to 55% by weight, and said mono-vinyl aryl compound is employed in an amount of from about 8.5 to 9.5% by weight.

16. An article of manufacture according to claim 15 in which said monomeric material is (a).

17. An article of manufacture according to claim 16 in which said diene is butadiene-1,3, said mono-vinyl aryl compound is styrene, said alkyl alkacrylate is methyl methacrylate, said alcohol is 2-amino-2-methyl-1-propanol and said acid is oleic acid.

18. An article comprising a metallic layer and a coating on said metallic layer deposited from a composition comprising a graft copolymer comprising from about 50 to 60% by weight of an open chain conjugated diene having from 4 to 8 carbon atoms, a mono-vinyl aryl compound in an amount of from 7 to 12% by weight and the balance being essentially at least one monomeric material selected from the group consisting of (a) an alkyl alkacrylate having the formula:

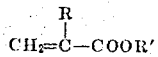

where R and R' are alkyl radicals of from 1 to 3 carbon atoms, (b) a monomeric mixture of (a) and up to about 50% by weight of the monomeric mixture of an alkyl acrylate having the formula $CH_2=CH-COOR''$ where R'' is an alkyl radical of from 1 to 8 carbon atoms, and (c) a mono-vinyl aryl monomer, the total of said diene, said mono-vinyl aryl compound and said monomeric material being equal to 100% by weight, and a salt of an aliphatic monocarboxylic acid having from 8 to 22 carbon atoms and a volatile aliphatic amino alcohol having one amino nitrogen atom and one hydroxyl group, having from 2 to 5 carbon atoms and being selected from the group consisting of primary amino alcohols and secondary amino alcohols, the mol ratio of said acid to said alcohol being 40:60 to 60:40, said diene and said mono-vinyl aryl compound having been polymerized to a conversion of from about 50 to 90% prior to further polymerization in the presence of said monomeric material.

19. An article comprising (I) a steel layer, (II) a first baked coating on said steel layer deposited from a composition comprising from about 40 to 80 parts by weight of a mixture of inorganic pigments and extenders and from 60 to 20 parts by weight of a graft copolymer comprising from about 50 to 60% by weight of an open chain conjugated diene having from 4 to 8 carbon atoms, a mono-vinyl aryl compound in an amount of from 7 to 12% by weight and the balance being essentially at least one monomeric material selected from the group consisting of (a) an alkyl alkacrylate having the formula:

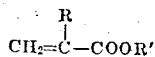

where R and R' are alkyl radicals of from 1 to 3 carbon atoms, (b) a monomeric mixture of (a) and up to about 50% by weight of the monomeric mixture of an alkyl acrylate having the formula $CH_2=CH-COR''$ where R'' is an alkyl radical of from 1 to 8 carbon atoms, and (c) a mono-vinyl aryl monomer, the total of said diene, said mono-vinyl aryl compound and said monomeric material being equal to 100% by weight, and containing a salt of an aliphatic monocarboxylic acid having from 8 to 22 carbon atoms and a volatile aliphatic amino alcohol having one amino nitrogen atom and one hydroxyl group, having from 2 to 5 carbon atoms and being selected from the group consisting of primary amino alcohols and secondary amino alcohols, the mol ratio of said acid to said alcohol being 40:60 to 60:40, and on said baked coating (III) a second baked coating of a material selected from the group consisting of enamels and lacquers, said diene and said mono-vinyl aryl compound having been polymerized to a conversion of from about 50 to 90% prior to further polymerization in the presence of said monomeric material.

References Cited by the Examiner

UNITED STATES PATENTS

| | | | |
|---|---|---|---|
| 2,490,677 | 12/1949 | Cupery | 260—29.6 |
| 2,512,697 | 6/1950 | Grotenhuis | 260—45.5 |
| 2,755,270 | 7/1956 | Hayes | 260—45.5 |
| 2,857,360 | 10/1958 | Feuer | 260—45.5 |
| 2,939,852 | 6/1960 | Schmidle | 260—45.5 |
| 2,963,045 | 12/1960 | Canevari et al. | 117—75 |

OTHER REFERENCES

Industrial and Engineering Chemistry, vol. 47, No. 4, April 1955, page 815.

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,231,410　　　　　　　　　　　　　　　　January 25, 1966

Gordon Huber et al.

It is hereby certified that error appears in the above numbered patent requiring correction and that the said Letters Patent should read as corrected below.

Column 12, line 9, for "$CH_2=CH-COR'''$" read -- $CH_2=CH-COOR''$ --.

Signed and sealed this 31st day of January 1967.

(SEAL)
Attest:

ERNEST W. SWIDER
Attesting Officer

EDWARD J. BRENNER
Commissioner of Patents